(12) United States Patent
Koul et al.

(10) Patent No.: US 8,145,840 B2
(45) Date of Patent: Mar. 27, 2012

(54) METHOD AND SYSTEM FOR STORING EXCESS DATA IN A REDUNDANT ARRAY OF INDEPENDENT DISK LEVEL 6

(75) Inventors: Sunny Koul, Karnataka (IN); Ranjan Kumar, Bokaro Steel (IN); Gururaj Shivashankar Morabad, Karnataka (IN)

(73) Assignee: LSI Corporation, Milpitas, CA (US)

( * ) Notice: Subject to any disclaimer, the term of this patent is extended or adjusted under 35 U.S.C. 154(b) by 428 days.

(21) Appl. No.: 12/478,771

(22) Filed: Jun. 5, 2009

(65) Prior Publication Data

US 2010/0312961 A1     Dec. 9, 2010

(51) Int. Cl.
*G06F 12/06* (2006.01)
(52) U.S. Cl. .................. 711/114; 711/E12.103
(58) Field of Classification Search .......... None
See application file for complete search history.

(56) References Cited

U.S. PATENT DOCUMENTS

| 7,237,062 B2* | 6/2007 | Lubbers et al. | 711/114 |
| 2004/0133743 A1* | 7/2004 | Ito et al. | 711/114 |
| 2007/0276999 A1* | 11/2007 | Golding | 711/114 |
| 2009/0037656 A1* | 2/2009 | Suetsugu et al. | 711/114 |

* cited by examiner

*Primary Examiner* — Denise Tran
(74) *Attorney, Agent, or Firm* — Prakash Nama; Global IP Services, PLLC

(57) ABSTRACT

A method and system for storing excess data in a redundant array of independent disks (RAID) level 6 are disclosed. In one embodiment, a method for storing excess data in a RAID 6 volume includes writing excess data to Q parity blocks of a first RAID 6 volume when a receipt of the excess data directed to the first RAID 6 volume is detected subsequent to a saturation of the first RAID 6 volume, where the first RAID 6 volume is converted to a pseudo-RAID 5 volume with P parity blocks. The method further includes re-computing the P parity blocks of the pseudo-RAID 5 volume based on data blocks of the pseudo-RAID 5 volume. In addition, the method includes constructing a second RAID 6 volume based on the pseudo-RAID 5 volume when at least one additional drive is inserted to the pseudo-RAID 5 volume.

20 Claims, 4 Drawing Sheets

METHOD AND SYSTEM FOR STORING EXCESS DATA IN A REDUNDANT ARRAY OF INDEPENDENT DISK LEVEL 6

FIELD OF TECHNOLOGY

Embodiments of the present invention relate to the field of storage systems. More particularly, embodiments of the present invention relate to redundant array of independent disks (RAID) level 6.

BACKGROUND

A redundant array of independent disks (RAID) is a technology that employs simultaneous use of multiple hard disk drives to achieve a high level of performance, reliability, and/or data volume size. A volume (e.g., a disk array) of RAID 6 stripes data and parity across all drives in the volume to protect integrity of the data and to increase data throughput to and/or from the volume. The volume of RAID 6 includes two sets of parity information (e.g., P parity blocks and Q parity blocks) to improve fault tolerance. Accordingly, the volume of RAID 6 can handle two simultaneous drive failures.

Although the two sets of parity information improves the fault tolerance of the volume of RAID 6, loss of data may result if excess data (e.g., data exceeding a storage capacity of the volume of RAID 6) being written to the volume is rejected by the volume.

SUMMARY

A method and system for storing excess data in a redundant array of independent disks (RAID) level 6 is disclosed. In one aspect, a method for storing excess data in a RAID 6 volume includes writing excess data to Q parity blocks of a first RAID 6 volume when a receipt of the excess data directed to the first RAID 6 volume is detected subsequent to a saturation of the first RAID 6 volume, wherein the first RAID 6 volume is converted to a pseudo-RAID 5 volume with P parity blocks. The method further includes re-computing the P parity blocks of the pseudo-RAID 5 volume based on data blocks of the pseudo-RAID 5 volume. In addition, the method includes constructing a second RAID 6 volume based on the pseudo-RAID 5 volume when at least one additional drive is inserted to the pseudo-RAID 5 volume.

In another aspect, a system in a storage control device for storing excess data in a RAID 6 volume includes a processor and a memory coupled to the processor. The memory is configured for temporarily storing a set of instructions, when executed by the processor, causes the processor to perform the method described above.

The methods, apparatuses and systems disclosed herein may be implemented in any means for achieving various aspects, and other features will be apparent from the accompanying drawings and from the detailed description that follow.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

A method and system for storing excess data in a redundant array of independent disks (RAID) level 6 is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1A:
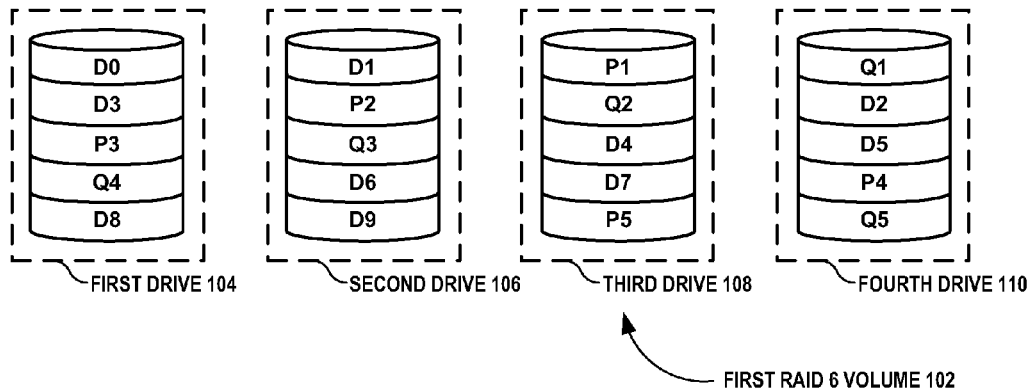
FIGS. 1A-1C illustrate an exemplary process for storing excess data in a RAID 6 volume, according to one embodiment.
Figure 1B:
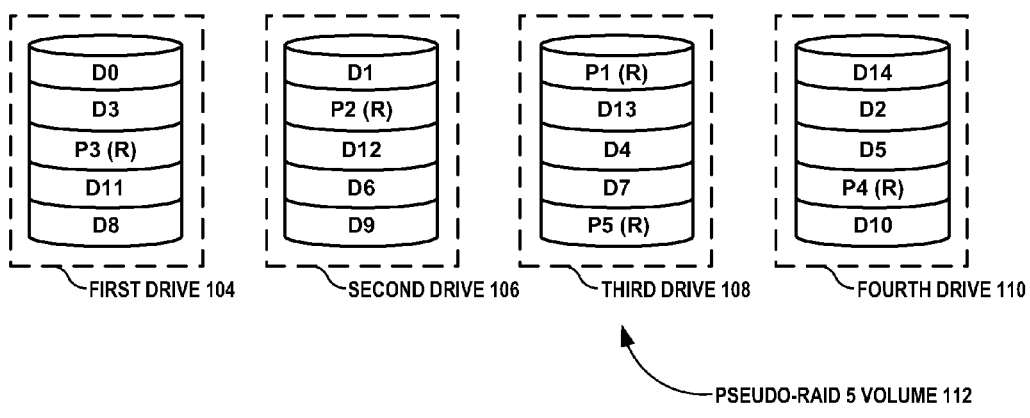
Figure 1C:
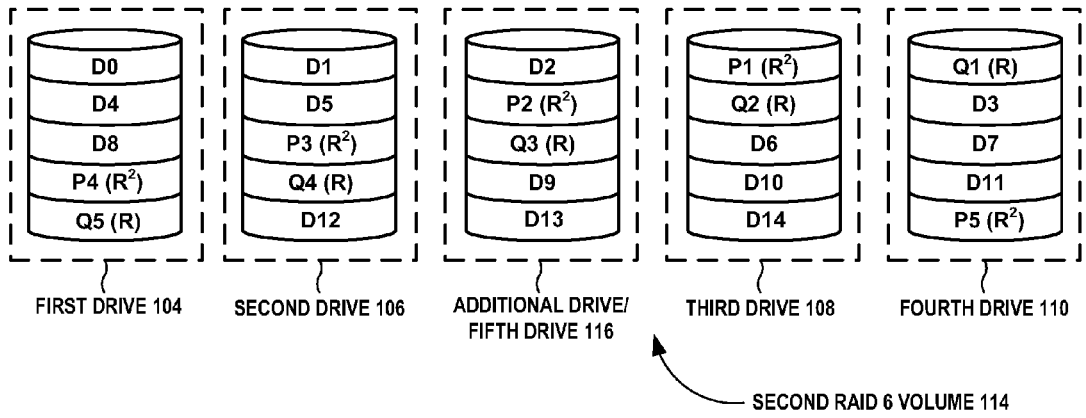

FIGS. 1A-1C illustrate an exemplary process for storing excess data in a RAID 6 volume, according to one embodiment. FIG. 1A illustrates a first RAID 6 volume 102 including four physical drives (e.g., a first drive 104, a second drive 106, a third drive 108, and a fourth drive 110). The first RAID 6 volume 102 includes five stripes in the first drive 104, the second drive 106, the third drive 108, and the fourth drive 110. Further, each of the five stripes of the first RAID 6 volume 102 includes two data blocks and two parity blocks (e.g., P parity block and Q parity block).

As illustrated, the first drive 102 includes a data block 0 (D0), data block 3 (D3), a P parity block 3 (P3), a Q parity block 4 (Q4) and a data block 8 (D8). The second drive 106 includes a data block 1 (D1), a P parity block 2 (P2), a Q parity block 3 (Q3), a data block 6 (D6), and a data block 9 (D9). The third drive 108 includes a P parity block 1 (P1), a Q parity block 2 (Q2), a data block 4 (D4), a data block 7 (D7), and a P parity block 5 (P5). The fourth drive 110 includes a Q parity block 1 (Q1), a data block 2 (D2), a data block 5 (D5), a P parity block 4 (P4) and a Q parity block 5 (Q5). It can be seen from FIG. 1A that, the four physical drives are filled with the data blocks and the parity blocks, thus causing saturation of the first RAID 6 volume 102.

Suppose, a receipt of excess data directed to the first RAID 6 volume 102 is detected subsequent to the saturation of the first RAID 6 volume 102. In such a scenario, the first RAID 6 volume 102 is broken and the excess data is written to the Q parity blocks (e.g., Q1, Q2, Q3, Q4 and Q5) of the first RAID 6 volume. Accordingly, when the excess data is written to the Q parity blocks of the first RAID 6 volume 102, the first RAID 6 volume 102 is converted to a pseudo-RAID 5 volume 112 with the P parity blocks (e.g., P1, P2, P3, P4 and P5), as illustrated in FIG. 1B. In one exemplary implementation, the receipt of excess data is indicated by a flag signal (e.g., an aural alarm, a visual alert and/or an event post). In another exemplary implementation, signature data (e.g., only 1's or any combination of 0's and 1's) is written subsequent to the excess data to fill the Q parity blocks if a size of the excess data is less than a size of the Q parity blocks in aggregate.

In the example embodiment illustrated in FIG. 1B, the excess data includes a data block 10 (D10), a data block 11

(D11), a data block 12 (D12), a data block 13 (D13) and a data block 14 (D14). Further, the data blocks D10, D11, D12, D13 and D14 are written to the Q parity blocks Q5, Q4, Q3, Q2 and Q1, respectively. Thus, the pseudo-RAID 5 volume 112 formed, upon writing the excess data to the Q parity blocks, includes the data blocks D10, D11, D12, D13 and D14 in addition to the data blocks and P parity blocks of the RAID 6 volume 102.

Further, each of the P parity blocks (e.g., P1, P2, P3, P4 and P5) in the pseudo-RAID 5 volume 112 is re-computed based on the corresponding data blocks in the pseudo-RAID 5 volume 112. For example, the P parity block P1 is re-computed based on the data blocks D0, D1, and D14. The P parity block P2 is re-computed based on the data blocks D3, D13, and D2. The P parity block P3 is re-computed based on the data blocks D12, D4, and D5. The P parity block P4 is re-computed based on the data blocks D11, D6, and D7. The P parity block P5 is re-computed based on the data blocks D8, D9, and D10. Thus, redundancy of data in the pseudo-RAID 5 volume 112 is maintained by re-computing the P parity blocks P1, P2, P3, P4 and P5 in the pseudo-RAID 5 volume 112.

FIG. 1C illustrates a process of constructing a second RAID 6 volume 114 based on the pseudo-RAID 5 volume 112 when an additional drive (e.g., a fifth drive 116) is inserted to the pseudo-RAID 5 volume 112. As illustrated, the fifth drive 116 is inserted to the pseudo-RAID 5 volume 112 as an additional drive based on a prompt signal for constructing the second RAID 6 volume 114. For example, the prompt signal may indicate that the excess data is stored to the Q parity blocks and a need to insert an additional drive exists to maintain the first RAID 6 volume 102 and construct the second RAID 6 volume 114.

As illustrated, the fifth drive 116 is inserted as the additional drive in a middle of the four physical drives to construct the second RAID 6 volume 114. When the fifth drive 116 is inserted, the data blocks of the pseudo-RAID 5 volume 112 are rearranged based on a set configuration. Then, P parity blocks (e.g., P1, P2, P3, P4 and P5) and Q parity blocks (e.g., Q1, Q2, Q3, Q4 and Q5) of the second RAID 6 volume 114 are computed. Thus, the second RAID 6 volume 114 is constructed based on the pseudo-RAID 5 volume 112 and the set configuration.

It is appreciated that the set configuration may be based on a common RAID Disk Data Format (DDF) specification or its variation. The common RAID DDF specification defines a standard data structure describing how data is formatted across drives in a RAID group (e.g., the four physical drives in the second RAID 6 volume). The common RAID DDF structure allows a basic level of interoperability between different suppliers of RAID technology and hence benefits storage users by enabling data-in-place migration among systems from different vendors.

In the example embodiment illustrated in FIG. 1C, the set configuration includes the first drive 104 of the second RAID 6 volume 114 to include the data blocks D0, the data block D4, the data block D8, the re-computed P parity block P4, and the re-computed Q parity block Q5. Further, the set configuration includes the second drive 106 of the second RAID 6 volume 114 to include the data block D1, the data block D5, the re-computed P parity block P3, the re-computed Q parity block Q4, and the data block D12.

The set configuration further includes the third drive 108 of the second RAID 6 volume 114 to include the re-computed P parity block P1, the re-computed Q parity block Q2, the data block D6, the data block D10, and the data block D14. Also, the set configuration includes the fourth drive 110 of the second RAID 6 volume 114 to include the re-computed Q parity block Q1, the data block D3, the data block D7, the data block D11, and the re-computed P parity block P5. Moreover, the set configuration includes the fifth drive 116 of the second RAID 6 volume 114 to include the data block D2, the re-computed P parity block P2, the re-computed Q parity block Q3, the data block D9, and the data block D13. Thus, by storing the excess data to the RAID 6 volume in the manner described above, data integrity and data reliability in the RAID 6 volume can be ensured.

Figure 2:
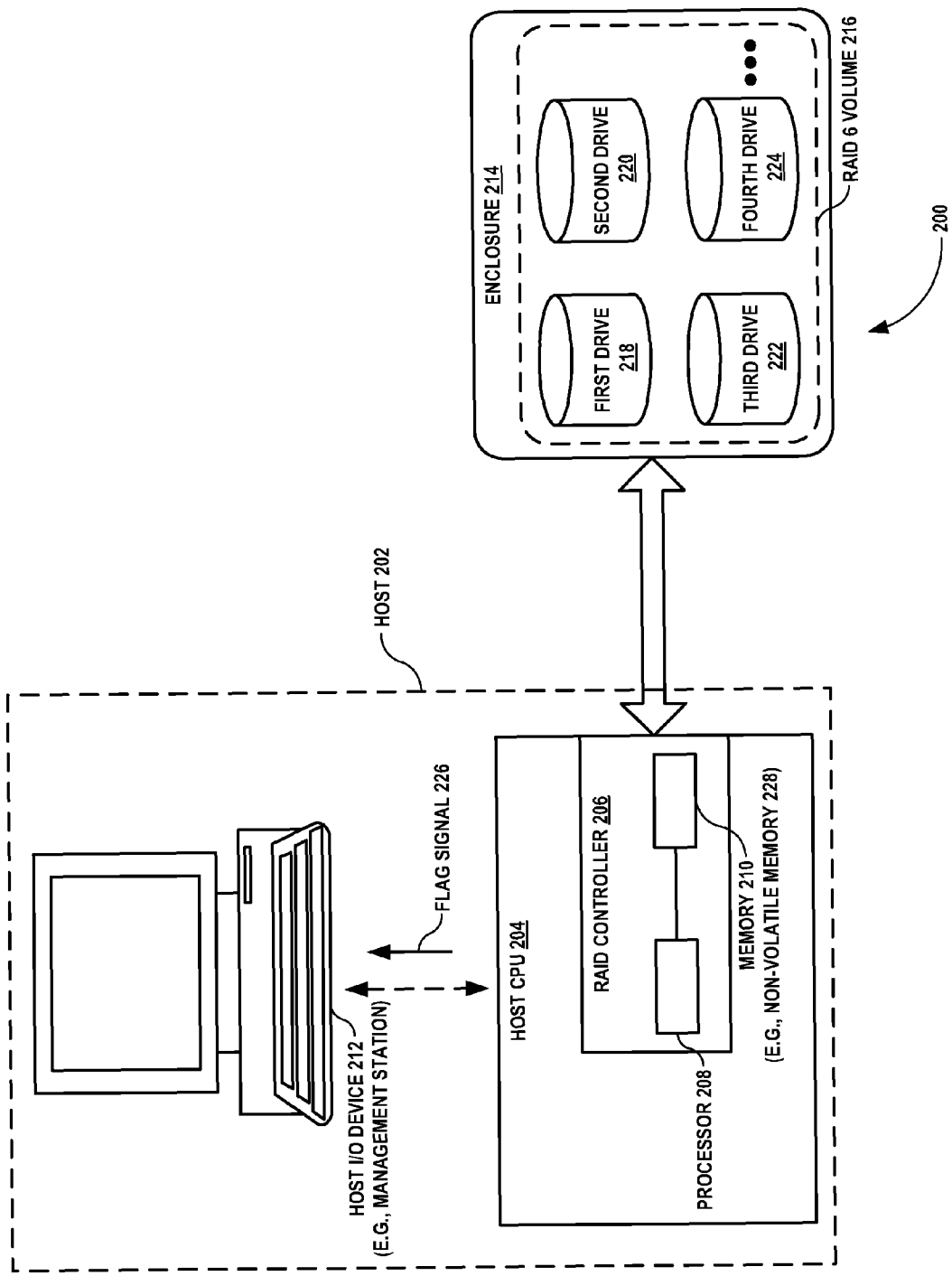
FIG. 2 illustrates an exemplary system for storing excess data in a RAID 6 volume, according to one embodiment.

FIG. 2 illustrates an exemplary system 200 for storing excess data in a RAID 6 volume, according to one embodiment. The system 200 includes a host 202 directly coupled to an enclosure 214. The host 202 includes a host central processing unit (CPU) 204 having a RAID controller 206 (e.g., a storage control device). The RAID controller 206 includes a processor 208 and a memory 210 (e.g., a non-volatile memory 228) coupled to the processor 208. The host 202 also includes a host input/output (I/O) device 212 (e.g., a management station) coupled to the host CPU 204. The enclosure 214 includes a plurality of physical drives, e.g., a first drive 218, a second drive 220, a third drive 222, a fourth drive 224, etc., forming a RAID 6 volume 216.

In one embodiment, the memory 210 is configured for temporarily storing a set of instructions that, when executed by the processor 208, causes the processor 208 to perform a method. The method includes writing excess data to Q parity blocks of a first RAID 6 volume (e.g., the RAID 6 volume 216). In one exemplary implementation, the excess data is written when a receipt of the excess data directed to the first RAID 6 volume 216 is detected subsequent to a saturation of the first RAID 6 volume 216. In one example embodiment, a flag signal 226 (e.g., an aural alarm, a visual alert, an event post, etc.) is forwarded to the host I/O device 212 to indicate the receipt of the excess data. It can be noted that, the first RAID 6 volume 216 is converted to a pseudo-RAID 5 volume with P parity blocks when the excess data is written to the Q parity blocks.

The method further includes re-computing the P parity blocks of the pseudo-RAID 5 volume based on data blocks of the pseudo-RAID 5 volume. Moreover, the method includes constructing a second RAID 6 volume based on the pseudo-RAID 5 volume when at least one additional drive is inserted to the pseudo-RAID 5 volume.

Figure 3:
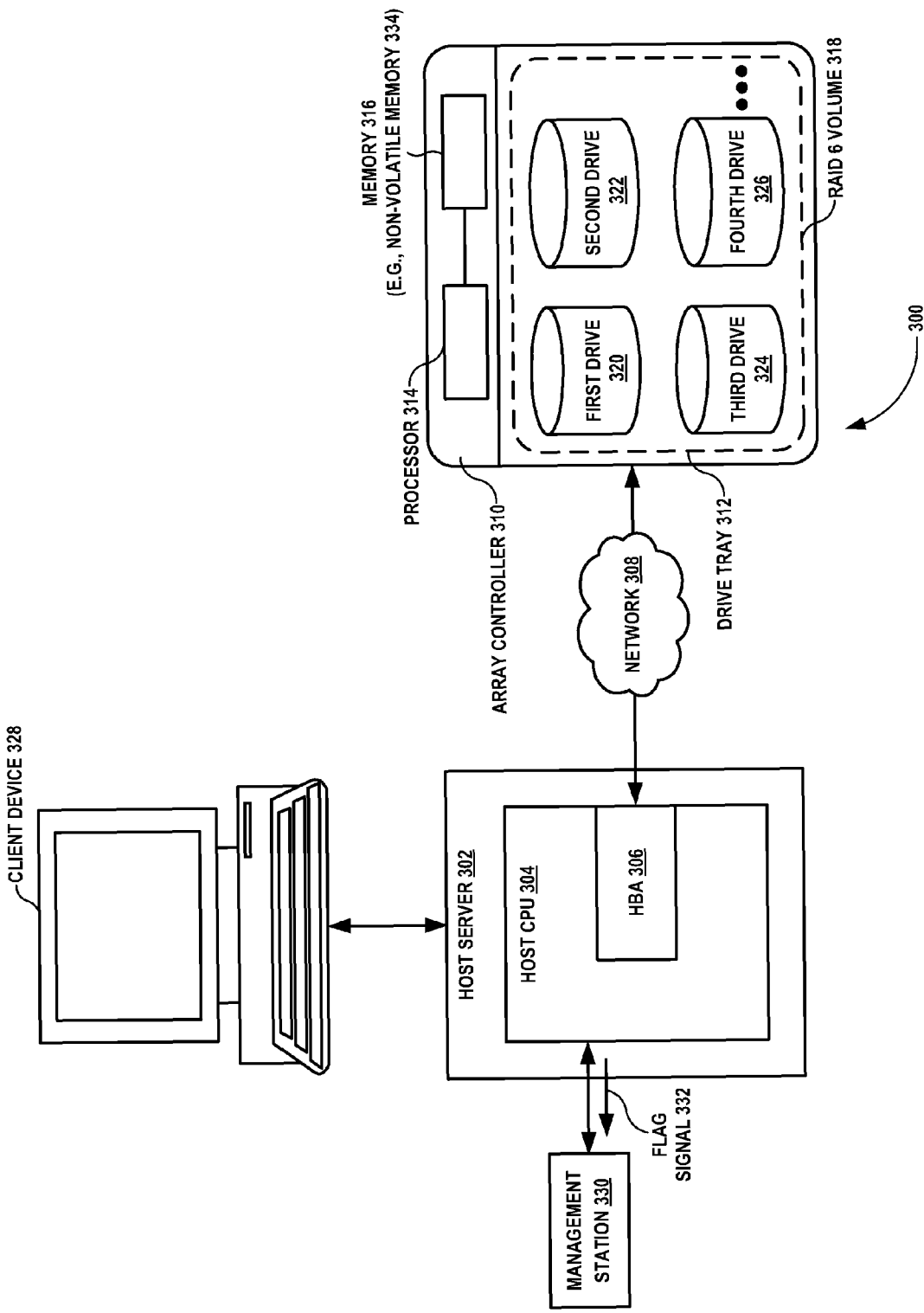
FIG. 3 illustrates another exemplary system for storing excess data in a RAID 6 volume, according to one embodiment.

FIG. 3 illustrates another exemplary system 300 for storing excess data in a RAID 6 volume, according to one embodiment. The system 300 includes a host server 302 communicatively coupled to an array controller 310 (e.g., storage control device) and a drive tray 312 via a network 308. The host server 302 includes a host CPU 304 with a host bus adapter (HBA) 306. The array controller 310 includes a processor 314 and a memory 316 (e.g., a non-volatile memory 334) coupled to the processor 314. The drive tray 312 includes physical drives forming a RAID 6 volume 318. As illustrated, a first drive 320, a second drive 322, a third drive 324 and a fourth drive 326 forms the RAID 6 volume 318. The system 300 also includes a client device 328 and a management station 330, coupled the host server 302.

In one embodiment, the memory 316 is configured for temporarily storing a set of instructions that, when executed by the processor 314, causes the processor 314 to perform a method. The method includes writing excess data to Q parity blocks of a first RAID 6 volume (e.g., the RAID 6 volume 318). In one exemplary implementation, the excess data is written when a receipt of the excess data directed to the first RAID 6 volume 318 is detected subsequent to a saturation of the first RAID 6 volume 318. In one example embodiment, a flag signal 332 (e.g., an aural alarm, a visual alert, an event post, etc.) is forwarded to the management station 330 to indicate the receipt of the excess data. It can be noted that, the first RAID 6 volume 318 is converted to a pseudo-RAID 5 volume with P parity blocks when the excess data is written to the Q parity blocks.

The method further includes re-computing the P parity blocks of the pseudo-RAID 5 volume based on data blocks of the pseudo-RAID 5 volume. Moreover, the method includes constructing a second RAID 6 volume based on the pseudo-RAID 5 volume when at least one additional drive is inserted to the pseudo-RAID 5 volume.

Figure 4:
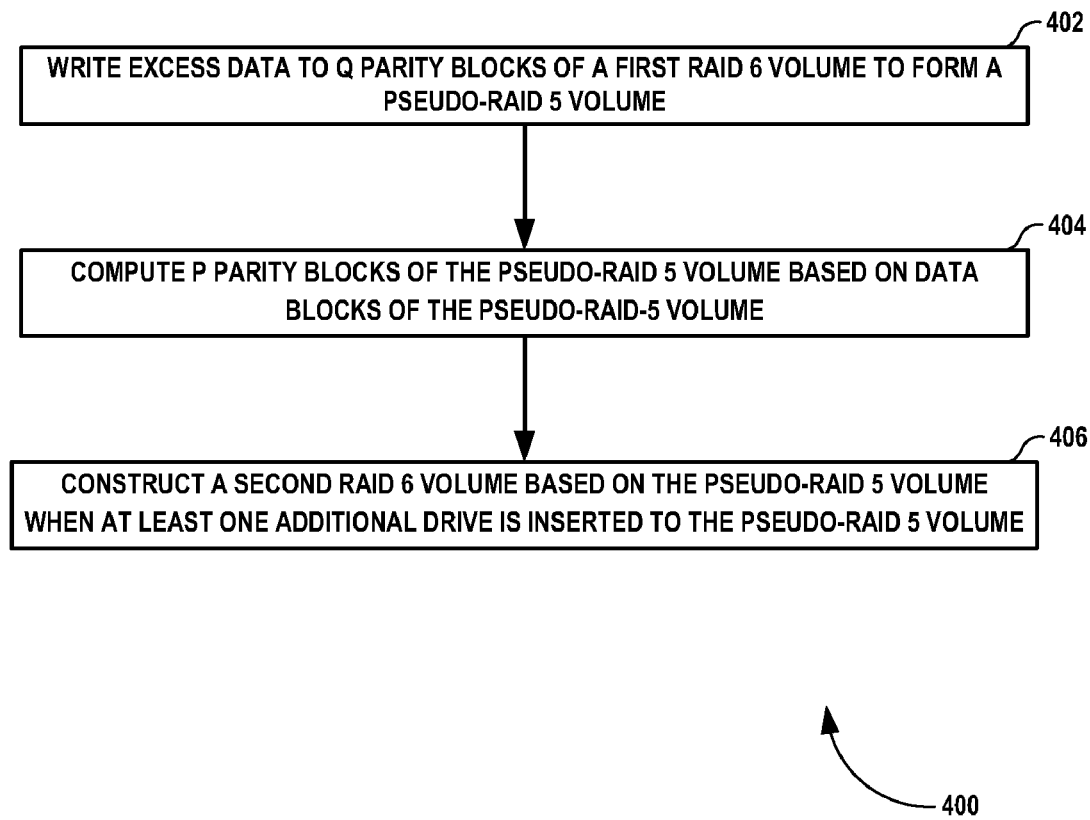
FIG. 4 illustrates a process flow chart of an exemplary method for storing excess data in a RAID 6 volume, according to one embodiment.

FIG. 4 illustrates a process flow chart of an exemplary method 400 for storing excess data in a RAID 6 volume, according to one embodiment. In operation 402, excess data is written to Q parity blocks of a first RAID 6 volume to form a pseudo-RAID 5 volume with P parity blocks. In one embodiment, the excess data is written to the Q parity blocks of the first RAID 6 volume when a receipt of the excess data directed to the first RAID 6 volume is detected subsequent to a saturation of the first RAID 6 volume. In one example embodiment, a flag signal is forwarded to indicate the receipt of the excess data. For example, the flag signal may include an aural alarm, a visual alert and/or an event post. In one exemplary implementation, signature data is written subsequent to the excess data to fill the Q parity blocks if a size of the excess data is less than a size of the Q parity blocks in aggregate.

In operation 404, the P parity blocks of the pseudo-RAID 5 volume are re-computed based on data blocks of the pseudo-RAID 5 volume. In operation 406, a second RAID 6 volume is constructed based on the pseudo-RAID 5 volume when at least one additional drive is inserted to the pseudo-RAID 5 volume. In one example embodiment, a prompt signal is forwarded for inserting the at least one additional drive to the pseudo-RAID 5 volume. In one exemplary implementation, the second RAID 6 volume is constructed by rearranging the data blocks of the pseudo-RAID 5 volume based on a set configuration. Further, P parity blocks and Q parity blocks of the second RAID 6 volume are computed upon completion of the rearranging the data blocks.

Moreover, in one example embodiment, a computer readable medium for storing excess data in the RAID 6 volume has instructions that, when executed by a computer, cause the computer to perform the method illustrated in FIG. 4.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuit (ASIC)).

What is claimed is:

1. A method for storing excess data in a redundant array of independent disks (RAID) 6 volume, comprising:
    writing excess data to Q parity blocks of a first RAID 6 volume when a receipt of the excess data directed to the first RAID 6 volume is detected subsequent to a saturation of the first RAID 6 volume, wherein the first RAID 6 volume is converted to a pseudo-RAID 5 volume with P parity blocks;
    re-computing the P parity blocks of the pseudo-RAID 5 volume based on data blocks of the pseudo-RAID 5 volume; and
    constructing a second RAID 6 volume based on the pseudo-RAID 5 volume when at least one additional drive is inserted to the pseudo-RAID 5 volume.

2. The method of claim 1, wherein the writing the excess data to the Q parity blocks further comprises writing signature data subsequent to the excess data to fill the Q parity blocks if a size of the excess data is less than a size of the Q parity blocks in aggregate.

3. The method of claim 1, wherein the writing the excess data comprises forwarding a flag signal to indicate the receipt of the excess data.

4. The method of claim 3, wherein the flag signal comprises an aural alarm, a visual alert, and an event post.

5. The method of claim 3, wherein the writing the excess data comprises forwarding a prompt signal for inserting the at least one additional drive to the pseudo-RAID 5 volume.

6. The method of claim 1, wherein the constructing the second RAID 6 volume comprises:
    rearranging the data blocks of the pseudo-RAID 5 volume based on a set configuration; and
    computing P parity blocks and Q parity blocks of the second RAID 6 volume upon completion of the rearranging the data blocks.

7. The method of claim 1, wherein the first RAID 6 volume comprises five stripes in four physical drives.

8. The method of claim 7, wherein a first drive of the four physical drives comprises a data block 0, data block 3, a P parity block 3, a Q parity block 4, and a data block 8; a second drive of the four physical drives comprises a data block 1, a P parity block 2, a Q parity block 3, a data block 6, and a data block 9; a third drive of the four physical drives comprises a P parity block 1, a Q parity block 2, a data block 4, a data block 7, and a P parity block 5; and a fourth drive of the four physical drives comprises a Q parity block 1, a data block 2, a data block 5, a P parity block 4, and a Q parity block 5.

9. The method of claim 8, wherein the excess data comprise a data block 10, a data block 11, a data block 12, a data block 13, and a data block 14.

10. The method of claim 9, wherein data blocks of the pseudo-RAID 5 volume comprises the data block 10 written to the Q parity block 5, the data block 11 written to the Q parity block 4, the data block 12 written to the Q parity block 3, the data block 13 written to the Q parity block 2, and the data block 14 written to the Q parity block 1.

11. The method of claim 10, wherein the re-computing the P parity blocks comprises re-computing the P parity block 1 based on the data block 0, the data block 1, and the data block 14; re-computing the P parity block 2 based on the data block 3, the data block 13, and the data block 2; re-computing the P parity block 3 based on the data block 12, the data block 4, and the data block 5; re-computing the P parity block 4 based on the data block 11, the data block 6, and the data block 7; and re-computing the P parity block 5 based on the data block 8, the data block 9, and the data block 10.

12. The method of claim 11, wherein the at least one additional drive comprises a fifth drive inserted in a middle of the four physical drives.

13. The method of claim 12, wherein the constructing the second RAID 6 volume comprises:
    rearranging the data blocks of the pseudo-RAID 5 volume based on a set configuration; and
    computing P parity blocks and Q parity block for the second RAID 6 volume upon completion of the rearranging the data blocks.

14. The method of claim 13, wherein the set configuration comprises the first drive of the second RAID 6 volume to include the data block 0, the data block 4, the data block 8, a re-computed P parity block 4, and a re-computed Q parity block 5; the second drive of the second RAID 6 volume to include the data block 1, the data block 5, a re-computed P parity block 3, a re-computed Q parity block 4, and the data block 12; the third drive of the second RAID 6 volume to include a re-computed P parity block 1, a re-computed Q parity block 2, the data block 6, the data block 10, and the data block 14; the fourth drive of the second RAID 6 volume to include a re-computed Q parity block 1, the data block 3, the data block 7, the data block 11, and a re-computed P parity block 5; and the fifth drive of the second RAID 6 volume to include the data block 2, a re-computed P parity block 2, a re-computed Q parity block 3, the data block 9, and the data block 13.

15. A system in a storage control device for storing excess data in a redundant array of independent disks (RAID) 6 volume, comprising:
   a processor; and
   a memory coupled to the processor and configured for temporarily storing a set of instructions, when executed by the processor, causes the processor to perform a method comprising:
      writing excess data to Q parity blocks of a first RAID 6 volume when a receipt of the excess data directed to the first RAID 6 volume is detected subsequent to a saturation of the first RAID 6 volume, wherein the first RAID 6 volume is converted to a pseudo-RAID 5 volume with P parity blocks;
      re-computing the P parity blocks of the pseudo-RAID 5 volume based on data blocks of the pseudo-RAID 5 volume; and
      constructing a second RAID 6 volume based on the pseudo-RAID 5 volume when at least one additional drive is inserted to the pseudo-RAID 5 volume.

16. The system of claim 15, wherein the storage control device comprises a RAID controller.

17. The system of claim 15, wherein the storage control device comprises an array controller.

18. The system of claim 15, wherein the memory comprises a non-volatile memory.

19. A non-transitory computer readable medium for storing excess data in a redundant array of independent disks (RAID) 6 volume having instructions that, when executed by a computer, cause the computer to perform a method comprising:
   writing excess data to Q parity blocks of a first RAID 6 volume when a receipt of the excess data directed to the first RAID 6 volume is detected subsequent to a saturation of the first RAID 6 volume, wherein the first RAID 6 volume is converted to a pseudo-RAID 5 volume with P parity blocks;
   re-computing the P parity blocks of the pseudo-RAID 5 volume based on data blocks of the pseudo-RAID 5 volume; and
   constructing a second RAID 6 volume based on the pseudo-RAID 5 volume when at least one additional drive is inserted to the pseudo-RAID 5 volume.

20. The non-transitory computer readable medium of claim 19, wherein the constructing the second RAID 6 volume comprises:
   rearranging the data blocks of the pseudo-RAID 5 volume based on a set configuration; and
   computing P parity blocks and Q parity blocks of the second RAID 6 volume upon completion of the rearranging the data blocks.

\* \* \* \* \*